(12) United States Patent
Sugai et al.

(10) Patent No.: US 11,559,835 B2
(45) Date of Patent: Jan. 24, 2023

(54) PROCESSING DEVICE, AND METHOD FOR CONTROLLING PROCESSING DEVICE

(71) Applicant: MITSUBISHI HEAVY INDUSTRIES, LTD., Tokyo (JP)

(72) Inventors: Atsushi Sugai, Tokyo (JP); Satoshi Kamata, Tokyo (JP); Suguru Kondo, Tokyo (JP); Takeshi Yamada, Tokyo (JP); Akira Kono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/259,340

(22) PCT Filed: Sep. 26, 2019

(86) PCT No.: PCT/JP2019/037777
§ 371 (c)(1),
(2) Date: Jan. 11, 2021

(87) PCT Pub. No.: WO2020/110442
PCT Pub. Date: Jun. 4, 2020

(65) Prior Publication Data
US 2021/0291254 A1    Sep. 23, 2021

(30) Foreign Application Priority Data
Nov. 30, 2018    (JP) .............. JP2018-225232

(51) Int. Cl.
*B21D 53/92*    (2006.01)
*B21D 11/14*    (2006.01)
(Continued)

(52) U.S. Cl.
CPC .............. *B21D 53/92* (2013.01); *B21D 11/14* (2013.01); *B21D 43/00* (2013.01); *B21D 47/00* (2013.01);
(Continued)

(58) Field of Classification Search
CPC ... B21D 3/02; B21D 7/08; B21D 7/12; B21D 11/10; B21D 11/14; B21D 43/006;
(Continued)

(56) References Cited

U.S. PATENT DOCUMENTS 4,080,815 A  *  3/1978  Foster ................. B21D 5/08
                                                    72/168
2009/0255310 A1 * 10/2009  Heinz ................. B21D 53/10
                                                    72/173
(Continued)

FOREIGN PATENT DOCUMENTS

FR    1298605 A  *  7/1962  ............ B21B 1/088
JP    05277570 A  *  10/1993
(Continued)

OTHER PUBLICATIONS

PCT/ISA/210, "International Search Report for PCT International Application No. PCT/JP2019/037777," dated Dec. 10, 2019.
(Continued)

*Primary Examiner* — Jermie E Cozart
(74) *Attorney, Agent, or Firm* — Manabu Kanesaka; Benjamin Hauptman; Kenneth Berner

(57) ABSTRACT

A processing device processes a frame-shaped workpiece which extends in a prescribed extension direction, and includes, integrally, a plate-shaped web surface portion, a plate-shaped first flange portion that bends and extends from one end of the web surface portion, and a plate-shaped second flange portion which bends from the other end of the web surface portion and extends in the opposite direction to the first flange portion. The processing device includes a shaping device which conveys the workpiece in the extension direction, and an exit side pinch roll device provided
(Continued)

further downstream, in the workpiece conveying flow direction, than the shaping device. The exit side pinch roll device includes a first roll which presses a central region of an upper surface side of the web surface portion, and a second roll which presses a central region of a lower surface side of the web surface portion.

3 Claims, 9 Drawing Sheets

(51) Int. Cl.
| | |
|---|---|
| *B64F 5/10* | (2017.01) |
| *B21D 43/00* | (2006.01) |
| *B21D 47/00* | (2006.01) |
| *B21D 11/10* | (2006.01) |
| *B21D 7/12* | (2006.01) |
| *B21D 47/01* | (2006.01) |
| *B21D 3/02* | (2006.01) |
| *B21D 7/08* | (2006.01) |

(52) U.S. Cl.
CPC ................ *B64F 5/10* (2017.01); *B21D 3/02* (2013.01); *B21D 7/08* (2013.01); *B21D 7/12* (2013.01); *B21D 11/10* (2013.01); *B21D 43/006* (2013.01); *B21D 47/01* (2013.01)

(58) Field of Classification Search
CPC ........ B21D 47/01; B21D 53/92; B21B 1/088; B21B 1/098
See application file for complete search history.

(56) References Cited

U.S. PATENT DOCUMENTS

| | | | | |
|---|---|---|---|---|
| 2012/0055219 | A1* | 3/2012 | Cooke | B21D 5/14 72/166 |
| 2013/0305798 | A1* | 11/2013 | Lee | B21D 5/086 72/31.07 |
| 2018/0369895 | A1 | 12/2018 | Ishihara et al. | |

FOREIGN PATENT DOCUMENTS

| | | | | |
|---|---|---|---|---|
| JP | 09029347 | A | * | 2/1997 |
| JP | 2003154410 | A | * | 5/2003 |
| JP | 2004-074260 | A | | 3/2004 |
| JP | 2013-237072 | A | | 11/2013 |
| JP | 2017-159325 | A | | 9/2017 |

OTHER PUBLICATIONS

PCT/ISA/237, "Written Opinion for PCT International Application No. PCT/JP2019/037777," dated Dec. 10, 2019.

* cited by examiner

FIG. 6

| SEQUENCE NUMBER | ROLL WIDTH (mm) | ROLLING REGION | PRESSING FORCE |
|---|---|---|---|
| 1 | 50 | CENTRAL REGION | STRONG |
| 2 | 25 | FIRST FLANGE PORTION SIDE REGION | WEAK |
| 3 | - | - | - |
| 4 | 50 | CENTRAL REGION | WEAK |
| 5 | 25 | SECOND FLANGE PORTION SIDE REGION | WEAK |
| 6 | 50 | FIRST FLANGE PORTION SIDE REGION | WEAK |
| 7 | 25 | CENTRAL REGION | WEAK |
| 8 | 25 | CENTRAL REGION | INTERMEDIATE |
| 9 | 25 | CENTRAL REGION | INTERMEDIATE TO STRONG |

PROCESSING DEVICE, AND METHOD FOR CONTROLLING PROCESSING DEVICE

RELATED APPLICATIONS

The present application is National Phase of International Application No. PCT/JP2019/037777 filed Sep. 26, 2019, and claims priority from Japanese Application No. 2018-225232, filed Nov. 30, 2019, the disclosure of which is hereby incorporated by reference herein in its entirety.

TECHNICAL FIELD

The present disclosure relates to a processing device and a method for controlling a processing device.

BACKGROUND ART

Aircraft components such as a fuselage and main wings of an aircraft are configured by structural members such as a long frame. To achieve an object of improving strength, such a frame is formed by bending and forming a plate-shaped member such that a section in a longitudinal direction has a desired sectional shape and forming the plate-shaped member into a curve shape which is curved along the longitudinal direction since a fuselage and main wings, to which the frame is applied, each have a curved surface shape.

A twist about an axis in the longitudinal direction occurs in some cases in the frame due to heat treatment at the time of processing. In such a case, it is necessary to correct the twist. As devices correcting the twist of the frame, for example, there are devices of PTLs 1 and 2.

In the device of PTL 1, a roll groove is formed in a roll, and in a state where a material to be processed is inserted in the roll groove, processing is performed as a load is applied to the material to be processed in a direction perpendicular to a rotation axis of the roll.

In addition, in the device of PTL 2, a material to be rolled is rolled in a gap formed between two rollers having different roll diameters from each other at both ends in a roll axial direction.

CITATION LIST

Patent Literature

[PTL 1] Japanese Unexamined Patent Application Publication No. 2013-237072
[PTL 2] Japanese Unexamined Patent Application Publication No. 2004-74260

SUMMARY OF INVENTION

Technical Problem

However, the devices of PTLs 1 and 2 correct a twist of the roller by changing the shape of the roller. That is, the devices of PTLs 1 and 2 correct the twist of the roller depending on the shape of the roller.

On the other hand, since the twist occurred in the frame is caused by various factors at the time of forming, a twisted state is not uniform in some cases. In the devices of PTLs 1 and 2, the correction of the twist depending on the shape of the roller is performed. For this reason, in order to finely adjust a degree of correction, it is necessary to manufacture rollers having different shapes each time. Accordingly, it is difficult to finely adjust the degree of correction, and there is a possibility that correction in accordance with a twisted state of the frame cannot be performed.

The present disclosure is devised in view of such circumstances, and an object thereof is to provide a processing device that can perform correction in accordance with a twisted state of an object to be processed and a method for controlling a processing device.

Solution to Problem

In order to solve the problems, the processing device and the method for controlling a processing device of the present disclosure adopt the following means.

According to an aspect of the present disclosure, there is provided a processing device that processes a frame-shaped object to be processed, which extends in a predetermined extending direction and integrally has a plate-shaped first surface portion, a plate-shaped second surface portion which is bent and extends from one end of the first surface portion, and a plate-shaped third surface portion which is bent from the other end of the first surface portion and extends in a direction opposite to the second surface portion. The processing device includes a transporting unit that transports the object to be processed in the extending direction and a pressing unit that is provided on an upstream side or a downstream side from the transporting unit in a transporting flow of the object to be processed. The pressing unit has a first contact portion that comes into contact with a central region on one surface side of the first surface portion in a direction intersecting the extending direction and a second contact portion that comes into contact with the central region on the other surface side of the first surface portion, and presses the object to be processed such that the object to be processed is sandwiched between the first contact portion and the second contact portion.

In the configuration, the plate-shaped first surface portion, the plate-shaped second surface portion which is bent and extends from the one end of the first surface portion, and the plate-shaped third surface portion which is bent from the other end of the first surface portion and extends in the direction opposite to the second surface portion are integrally provided, and the frame-shaped object to be processed extending in the predetermined extending direction is processed. That is, the frame-shaped object to be processed having a substantially Z-shaped section in a longitudinal direction is processed. When processing the object to be processed having such a shape, the object to be processed is transported by the transporting unit in the extending direction, and the central region of the first surface portion is pressed by the pressing unit such that the central region is sandwiched. Accordingly, even in a case where a twist about an axis extending in the extending direction has occurred in the object to be processed, the twist can be corrected as the pressing unit presses the central region.

Specifically, an end portion region of the first surface portion of the object to be processed, in which a twist has occurred, has a larger twist amount than the central region has. In other words, the end portion region is more curved. For this reason, the length of the end portion region in the longitudinal direction along the first surface portion is larger than the central region by the amount that the curved amount is larger. When the central region is pressed, the central region of the object to be processed in such a state is rolled. As the central region is rolled, the lengths of the central region and the end portion region in the longitudinal direction along the first surface portion are balanced, and the twist is corrected.

In addition, in the configuration, as the pressing unit presses the object to be processed, a twist of the object to be processed is corrected. Since the twist is corrected through pressing in this manner, a degree of twist correction can be changed simply by adjusting a pressing force of the pressing unit. Therefore, for example, compared to a case where a twist is corrected in accordance with a shape of the contact portion, a degree of twist correction can be easily adjusted. Accordingly, correction in accordance with a twisted state of the object to be processed can be easily performed.

Correcting the twist means bringing a plate surface of the plate-shaped first surface portion closer to a flat state. In addition, the central region means, for example, a region of 25 percent to 75 percent of the width of the first surface portion.

In addition, in the processing device according to the aspect of the present disclosure, the first contact portion may be a first roll that rotates about an axis extending in the direction intersecting the extending direction, the second contact portion may be a second roll that rotates about an axis extending in the direction intersecting the extending direction, and widths of the first roll and the second roll may be 30 to 60 percent of a width of the first surface portion.

In the configuration, the object to be processed is pressed by the first roll and the second roll which are formed to have a width of 30 percent to 60 percent of the width of the first surface portion. Accordingly, a twist can be more preferably corrected.

In addition, the processing device according to the aspect of the present disclosure may further include a moving unit that moves the first contact portion and/or the second contact portion in a direction of the object to be processed, a detecting unit that detects a twist amount of the object to be processed about an axis extending in the extending direction, and a control unit that controls the moving unit such that the first contact portion and/or the second contact portion moves by a distance in accordance with the twist amount detected by the detecting unit.

In the configuration, the moving unit is controlled such that the first contact portion and/or the second contact portion is moved by the distance in accordance with the twist amount. Accordingly, correction in accordance with a twist amount can be performed on the object to be processed. Therefore, a twist can be corrected more precisely.

According to another aspect of the present disclosure, there may be provided a method for controlling a processing device that processes a frame-shaped object to be processed, which extends in a predetermined extending direction and integrally has a plate-shaped first surface portion, a plate-shaped second surface portion which is bent and extends from one end of the first surface portion, and a plate-shaped third surface portion which is bent from the other end of the first surface portion and extends in a direction opposite to the second surface portion. The processing device may have a transporting unit that transports the object to be processed in the extending direction, a pressing unit that has a first contact portion coming into contact with a central region on one surface side of the first surface portion in a direction intersecting the extending direction and a second contact portion coming into contact with the central region on the other surface side of the first surface portion, presses the object to be processed such that the object to be processed is sandwiched between the first contact portion and the second contact portion, and is provided on an upstream side or a downstream side from the transporting unit in a transporting flow of the object to be processed, a moving unit that moves the first contact portion and/or the second contact portion in a direction of the object to be processed, and a detecting unit that detects a degree of a twist of the object to be processed about an axis extending in the extending direction. The method for controlling a processing device may include a step of controlling the moving unit such that the first contact portion and/or the second contact portion moves by a distance in accordance with the degree of the twist detected by the detecting unit.

Advantageous Effects of Invention

In the present disclosure, correction in accordance with a degree of a twist of the object to be processed can be performed.

BRIEF DESCRIPTION OF DRAWINGS

FIG. 6 is a chart showing nine cases in which the rolled region, the roll width, and a pressing force are changed.

DESCRIPTION OF EMBODIMENTS

Hereinafter, an embodiment of a processing device and a method for controlling a processing device according to the present disclosure will be described with reference to the drawings.

Hereinafter, a processing device 10 according to the embodiment of the present disclosure is a device used when manufacturing a structural member such as a long frame applied to a fuselage or main wings of an aircraft, and is a processing device that performs so-called contour roll forming on a workpiece (object to be processed) 1. That is, as illustrated in FIG. 1, the processing device 10 is a device that performs forming of curving the long and linear workpiece 1 into a bow shape so as to have an arc shape in a longitudinal direction.

Figure 3:
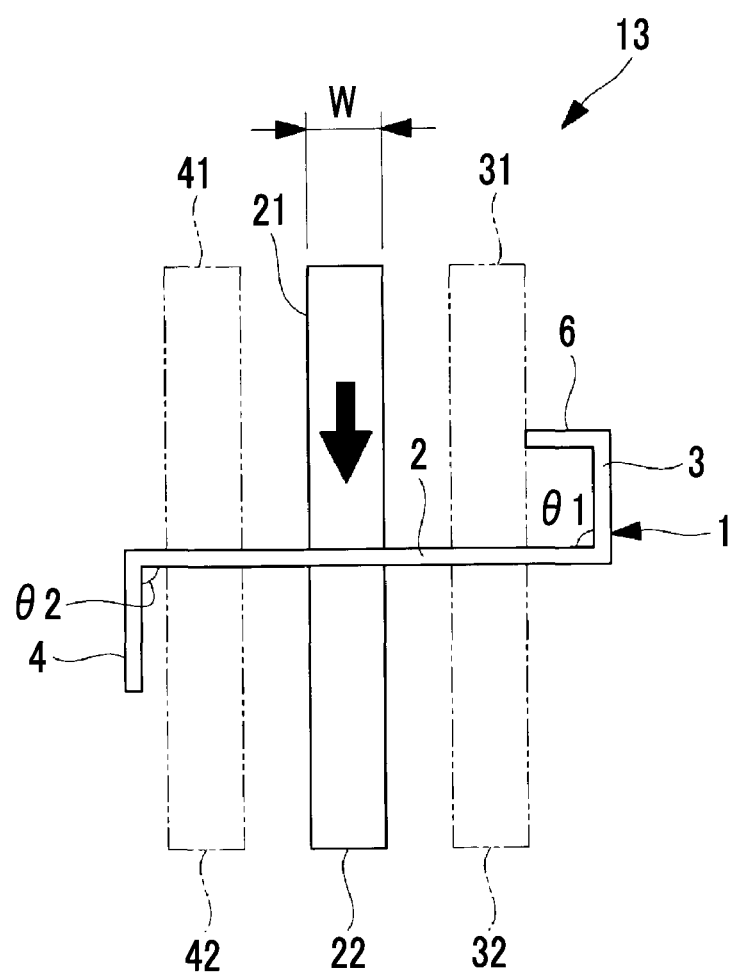
FIG. 3 is a schematic plan view illustrating a first roll and a second roll of the correction device of FIG. 1 and a workpiece.

As illustrated in FIG. 3, the workpiece 1 according to the present embodiment has a substantially Z-shaped section in the longitudinal direction. As a plate-shaped member made of an aluminum alloy undergoes bending that imparts the sectional shape, the workpiece 1 is formed. Specifically, the workpiece 1 integrally has a plate-shaped web surface portion (first surface portion) 2, a plate-shaped first flange portion (second surface portion) 3 that is bent from one end of the web surface portion 2 in a lateral direction at a substantially right angle and is extended, a plate-shaped second flange portion (third surface portion) 4 that is bent from the other end of the web surface portion 2 in the lateral direction at a substantially right angle and is extended in a direction opposite to a direction in which the first flange portion 3 extends, and a lip portion 6 that is bent from an end portion of the first flange portion 3 on an opposite side to an end portion connected to the web surface portion 2 at a substantially right angle and is extended in the direction of the second flange portion 4. An angle θ1 formed by the web surface portion 2 and the first flange portion 3 is set to approximately 90 degrees. In addition, an angle θ2 formed by the web surface portion 2 and the second flange portion 4 is also set to approximately 90 degrees. The length of the web surface portion 2 in the lateral direction (hereinafter, referred to as a "length in a width direction") is 50 mm to 200 mm. In addition, the thickness of the web surface portion 2 is 2 mm to 4 mm.

Figure 1:
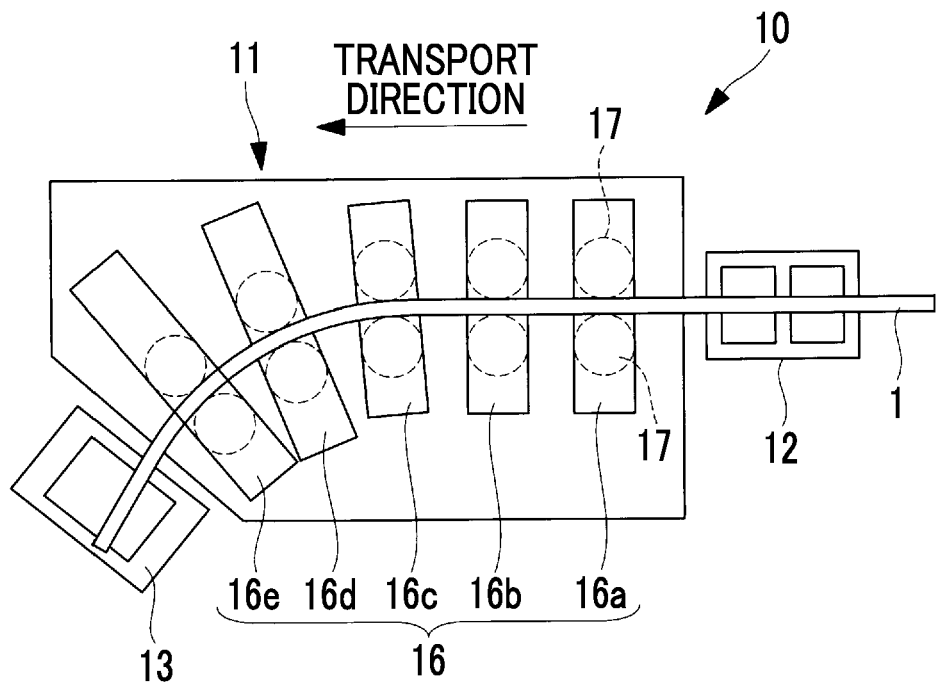
FIG. 1 is a schematic plan view of a processing device according to an embodiment of the present disclosure.

As illustrated in FIG. 1, the processing device 10 includes a forming device (transporting unit) 11 that performs curve-forming while transporting the long workpiece 1 in a predetermined direction, an inlet-side pinch roll device 12 that introduces the workpiece 1 into the forming device 11, and an outlet-side pinch roll device (pressing unit) 13 that takes the workpiece 1 out from the forming device 11. The processing device 10 transports the workpiece 1 introduced in the forming device 11 in the predetermined direction and performs forming of curving the workpiece 1 in a bow shape to form an arc in the longitudinal direction. An arrow of FIG. 1 indicates a transportation direction of the workpiece 1.

The forming device 11 has five support devices 16 that are disposed side by side in the transportation direction (predetermined direction) of the workpiece 1 and a drive device (not illustrated) that moves a certain support device in an intersecting direction which is a direction intersecting a transfer direction.

Each of the support devices 16 has a pair (two) of rolls 17 that are disposed to face each other such that rotation axes extending in an up-and-down direction are parallel to each other. Each of the support devices 16 supports the long workpiece 1 such that the workpiece can be transported in the predetermined direction with the long workpiece 1 sandwiched between the pair of rolls 17. In addition, a servomotor (not illustrated) that rotationally drives the roll 17 about the rotation axis is connected to each of the rolls 17 provided in each of the support devices 16. Each of the support devices 16 transports the introduced workpiece 1 in the transportation direction with a rotational drive force of the rolls 17.

As described above, the five support devices 16 are disposed side by side in the transportation direction of the workpiece 1. In the following description, in order from the support device 16 disposed on an inlet-side pinch roll device 12 side (that is, an upstream side in a transporting flow of the workpiece 1), the support devices will be referred to as a first support device 16a, a second support device 16b, a third support device 16c, a fourth support device 16d, and a fifth support device 16e. In addition, the third support device 16c, the fourth support device 16d, and the fifth support device 16e are disposed to be inclined by a predetermined angle with respect to the first support device 16a and the second support device 16b. In addition, each of the support devices 16 is disposed such that an inclination angle of the third support device 16c, an inclination angle of the fourth support device 16d, and an inclination angle of the fifth support device 16e are different from each other. That is, the third support device 16c, the fourth support device 16d, and the fifth support device 16e are not disposed parallel to each other. The disposition of each of the support devices 16 is set in accordance with a curved state (curvature) of the workpiece 1 after forming.

Three drive devices are provided to correspond to the third support device 16c, the fourth support device 16d, and the fifth support device 16e. That is, in the present embodiment, among the five support devices 16 provided in the forming device 11, the third support device 16c, the fourth support device 16d, and the fifth support device 16e are movable. On the other hand, the first support device 16a and the second support device 16b are configured not to move. A moving unit linearly moves the support devices 16 in the intersecting direction with a driving force from a driving source (not illustrated). Moving directions of the third support device 16c, the fourth support device 16d, and the fifth support device 16e are not parallel to each other. The moving direction of each of the support devices 16 is set in accordance with a curved state (curvature) of the workpiece 1 after forming.

The inlet-side pinch roll device 12 is disposed on the upstream side of the first support device 16a. The inlet-side pinch roll device 12 has a roll (not illustrated), and assists in introducing the workpiece 1 into the first support device 16a with the rotational drive force of the rolls 17.

Figure 2:
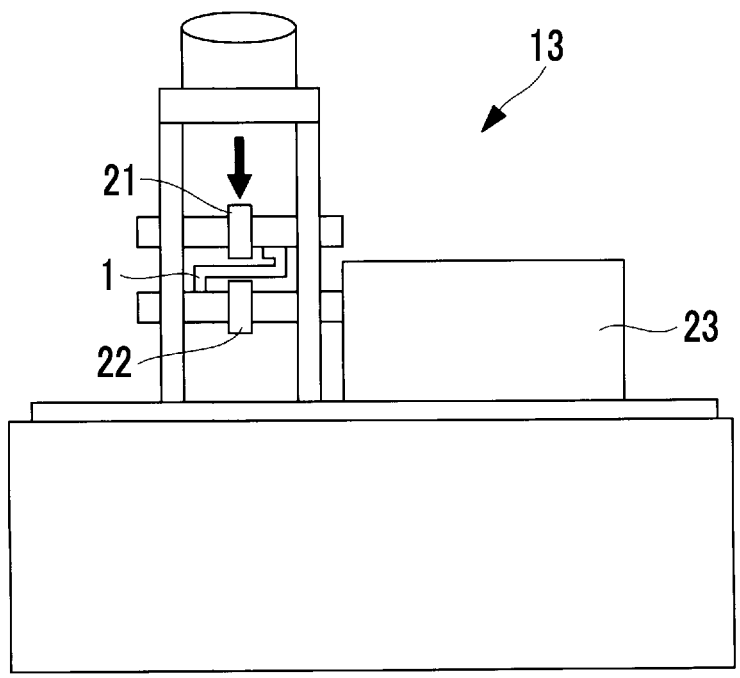
FIG. 2 is a schematic front view of a correction device of FIG. 1.

As illustrated in FIG. 1, the outlet-side pinch roll device 13 is disposed on a downstream side of the fifth support device 16e. As illustrated in FIG. 2, the outlet-side pinch roll device 13 has a first roll (first contact portion) 21 that comes into contact with a central region on one surface side (upper surface side in the present embodiment) of the web surface portion 2 in the width direction (direction intersecting an extending direction), a second roll (second contact portion) 22 that comes into contact with a central region on the other surface side (lower surface side in the present embodiment) of the web surface portion 2 in the width direction, and a moving device (moving unit) 23 that moves the first roll 21 in the up-and-down direction. By moving the first roll 21 downward, the outlet-side pinch roll device 13 presses the workpiece such that the central region of the workpiece 1 is sandwiched between the first roll 21 and the second roll 22. The central region in the present embodiment is a region of 30 to 60 percent of the length of the web surface portion 2 in the width direction.

The first roll 21 and the second roll 22 each rotate about an axis extending in a horizontal direction. That is, the first roll 21 and the second roll 22 are disposed to face each other such that rotation axes are parallel to each other. The first roll 21 and the second roll 22 are rotationally driven by a driving force from a rotary drive device. As illustrated in FIG. 3, a length w (hereinafter, referred to as a "roll width w") of each of the first roll and the second roll 22 in a direction in which the rotation axis extends is 20 mm to 50 mm.

The processing device 10 operates as follows.

First, a leading edge of the workpiece 1 introduced in the processing device 10 is sandwiched between the rolls 17 of the first support device 16a with the assistance of the inlet-side pinch roll device 12. The workpiece 1 sandwiched between the rolls 17 of the first support device 16a is transported from the second support device 16b to the fifth support device 16e in turn with the rotational drive force of the rolls 17. At this time, the third support device 16c to the fifth support device 16e support the workpiece 1 and are moved in a direction intersecting the transportation direction with the drive device. As the third support device 16c to the fifth support device 16e move, the workpiece 1 is curved into a bow shape. The fifth support device 16e discharges the workpiece 1 with the driving force of the rolls 17. The workpiece 1 discharged from the fifth support device 16e is sandwiched in the outlet-side pinch roll device 13. Specifically, the central region of the web surface portion 2 is sandwiched between the first roll 21 and the second roll 22 in the up-and-down direction. At this time, the central region of the web surface portion 2 is rolled by the first roll 21 and the second roll 22. The workpiece 1 rolled by the outlet-side pinch roll device 13 is discharged from the outlet-side pinch roll device 13.

In the present embodiment, the following operational effects are achieved.

When the processing device 10 according to the present embodiment performs processing, a twist about an axis in the longitudinal direction occurs in some cases in the long workpiece 1 due to heat treatment at the time of processing in the previous stage. In the processing device 10 of the present embodiment, contour roll forming can be performed on the workpiece 1 in which the twist has occurred, and the twist can be corrected.

Specifically, in the present embodiment, when processing the frame-shaped workpiece 1 of which a sectional shape in the longitudinal direction is a substantially Z-shape, the workpiece 1 is transported by the forming device 11 and the central region of the web surface portion 2 is pressed and sandwiched in the outlet-side pinch roll device 13. Accordingly, even in a case where a twist about an axis extending in the extending direction has occurred in the workpiece 1, the twist can be corrected as the pressing unit presses the central region.

Specifically, an end portion region of the web surface portion 2 of the workpiece 1, in which a twist has occurred, has a larger twist amount than the central region has. In other words, the end portion region is more curved. For this reason, the length of the end portion region in the longitudinal direction along the web surface portion 2 is larger than the central region by the amount that the curved amount is larger. When the central region is pressed, the central region of the workpiece 1 in such a state is rolled. As the central region is rolled, the lengths of the central region and the end portion region in the longitudinal direction along the web surface portion 2 are balanced. Therefore, the twist of the workpiece 1 can be corrected.

In addition, in the present embodiment, as the first roll 21 and the second roll 22 press the workpiece 1, a twist of the workpiece 1 is corrected. Since the twist is corrected through pressing in this manner, a degree of twist correction can be changed simply by adjusting a pressing force of the first roll 21 and the second roll 22. Therefore, for example, compared to a case where a twist is corrected in accordance with a shape of the roll supporting the workpiece 1, a degree of twist correction can be easily adjusted. Accordingly, correction in accordance with a twisted state of the workpiece 1 can be easily performed.

Correcting the twist means bringing a plate surface of the plate-shaped web surface portion 2 closer to a flat state (reference surface).

In addition, since contour forming is performed and a twist is corrected, the number of steps can be reduced compared to a case where a twist is corrected separately from contour forming.

In addition, in the present embodiment, the roll width w of each of the first roll 21 and the second roll 22 is set to 20 mm to 30 mm. That is, the roll width w of each of the first roll 21 and the second roll 22 is 30 percent to 60 percent of the width of the web surface portion 2. Accordingly, a twist of the workpiece 1 can be more preferably corrected.

Herein, a workpiece 1 twist correction effect of the outlet-side pinch roll device 13 will be described in detail with reference to FIGS. 4 to 10.

Figure 4:
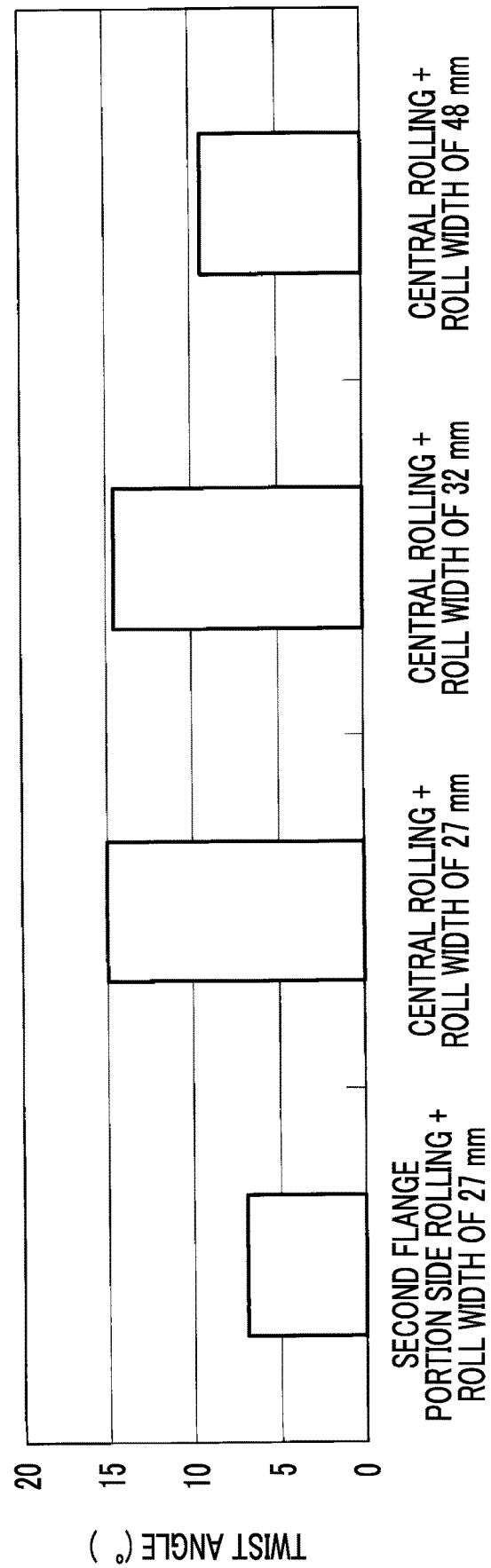
FIG. 4 is a graph showing a relationship between a rolled region and a roll width, and a twist angle.
Figure 5:
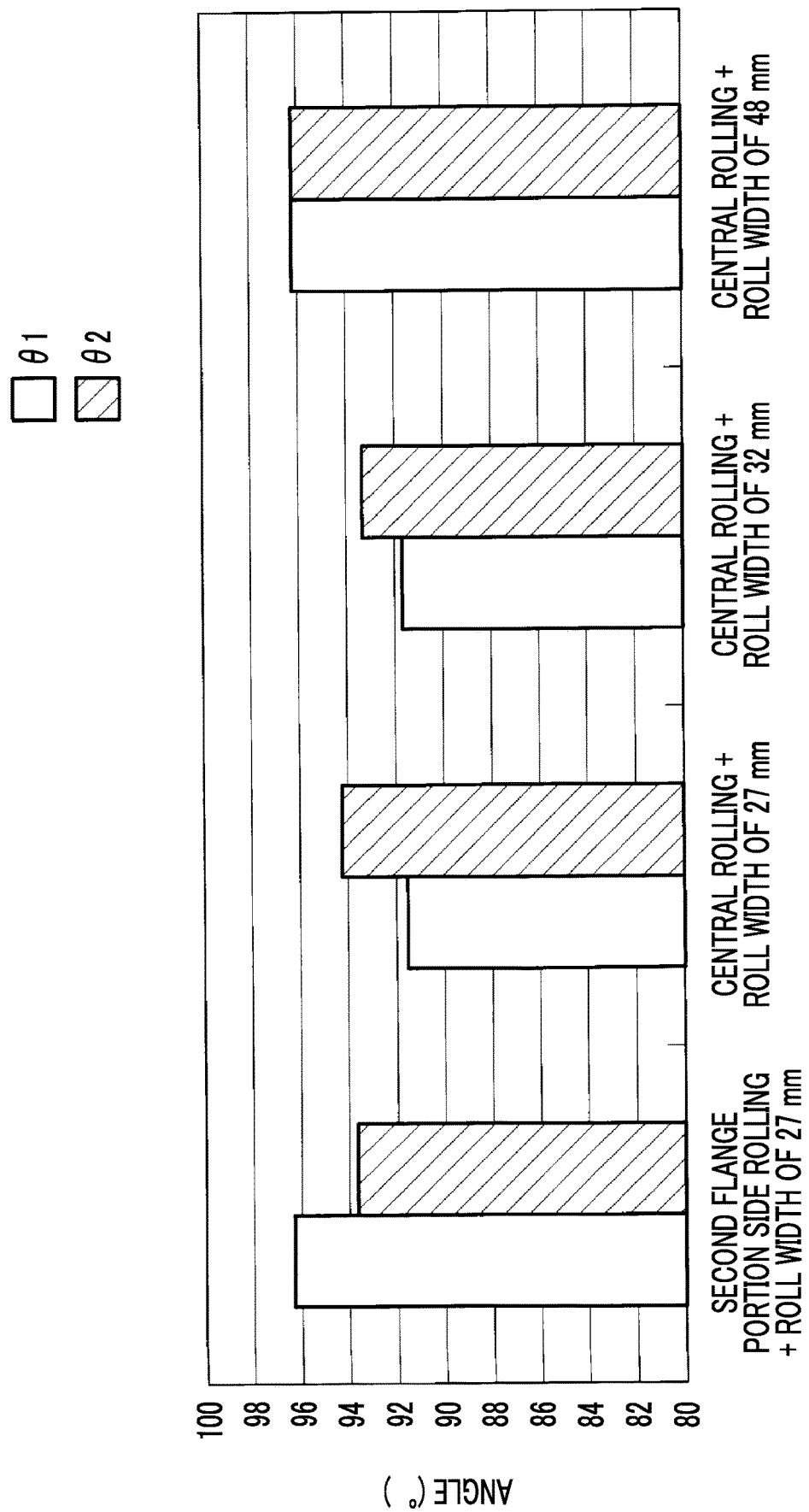
FIG. 5 is a graph showing a relationship between the rolled region and the roll width, and an angle θ1 formed by a web surface portion a first flange portion and an angle θ2 formed by the web surface portion and a second flange portion.

FIG. 4 is a graph showing results of analyzing, through simulation, twist angles (angle formed by the reference surface to be described later and an actual web surface) in four cases, in which a rolled region and the roll width w are changed. In addition, FIG. 5 is a graph showing results of analyzing, through simulation, the angle θ1 formed by the web surface portion 2 and the first flange portion 3 and the angle θ2 formed by the web surface portion 2 and the second flange portion 4 in the same four cases as in FIG. 4. In FIGS. 4 and 5, the workpiece 1 which is twisted 5 degrees in a clockwise direction is used as an analysis model.

The leftmost graphs of FIGS. 4 and 5 show a case where the roll width w of each of the first roll 21 and the second roll 22 is set to 27 mm and a region on a second flange side (refer to a first roll 31 and a second roll 32 shown with two-dot chain lines in FIG. 3) is rolled. In addition, similarly, the second graphs from the left show a case where the roll width w is set to 27 mm and the central region (refer to the first roll 21 and the second roll 22 of FIG. 3) is rolled. In addition, similarly, the second graphs from the right show a case where the roll width w is set to 32 mm and the central region is rolled. In addition, similarly, the rightmost graphs show a case where the roll width w is set to 48 mm and the central region is rolled.

As it is clear from FIG. 4, it can be seen that the second case from the left, in which the roll width w is set to 27 mm and the central region (refer to the first roll 21 and the second roll 22 of FIG. 3) is rolled, has the largest twist angle and a high twist correction effect. In addition, it can be seen that the second case from the right, in which the roll width w is set to 32 mm and the central region is rolled, has the second largest twist angle and has a high twist correction effect.

In addition, as it is clear from FIG. 5, the second case from the right, in which the roll width w is set to 32 mm and the central region is rolled, has the values of θ1 and θ2 that are closest to 90 degrees. The second case from the left, in which the roll width w is set to 27 mm and the central region (refer to the first roll 21 and the second roll 22 of FIG. 3) is rolled, has the values of θ1 and θ2 that are second closest to 90 degrees.

From FIGS. 4 and 5, it can be seen that a twist correction effect is high and the angles of θ1 and θ2 can be maintained close to 90 degrees when the central region of the web surface portion 2 is rolled by the first roll 21 and the second roll 22, of which the roll width w is not excessively large.

Figure 7:
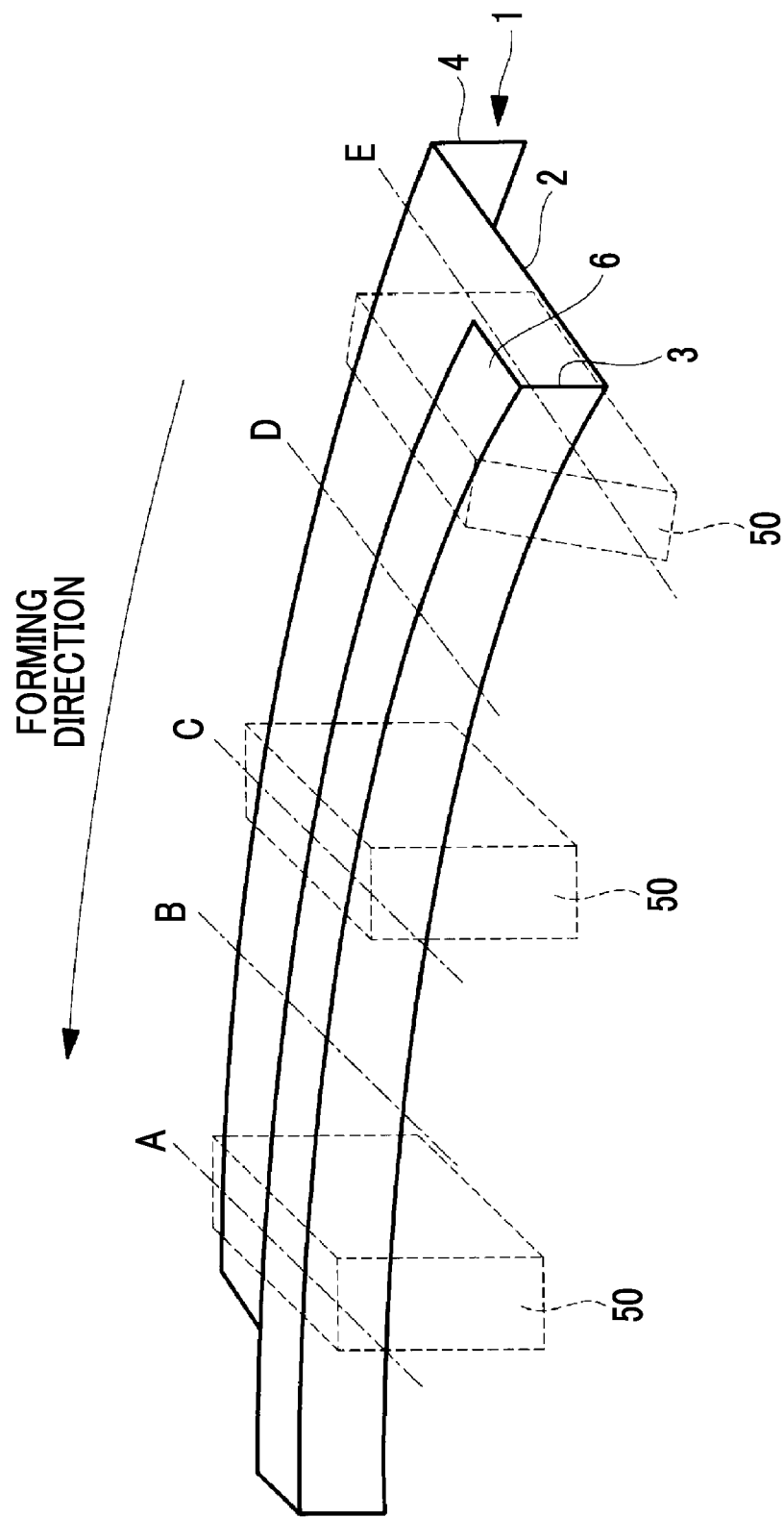
FIG. 7 is a perspective view illustrating a state where the workpiece is disposed on a surface plate.

FIGS. 8 to 11 are graphs showing results obtained by trial production of the processing device in nine cases shown in FIG. 6. In the trial production, as shown with a sequence number 1 to a sequence number 9 of the table of FIG. 6, nine cases, in which a rolled region, the roll width w, and a pressing force are changed, are prepared. In each case, the workpiece 1 after correction is mounted on a surface plate 50 as illustrated in FIG. 7, and a difference between a lower surface of the web surface portion 2 and a reference surface at each of predetermined positions (A to E of FIG. 7) in the longitudinal direction is measured. The case of the sequence number 3 is a case where rolling is not performed by the outlet-side pinch roll device 13. In addition, a region on the second flange portion 4 side is a region rolled by a first roll 41 and a second roll 42 shown with two-dot chain lines in FIG. 3. In addition, in the present trial production, contour forming is performed on the workpiece 1 such that curvature on a first flange portion 3 side is lower than curvature on the second flange portion 4 side.

Figure 8:
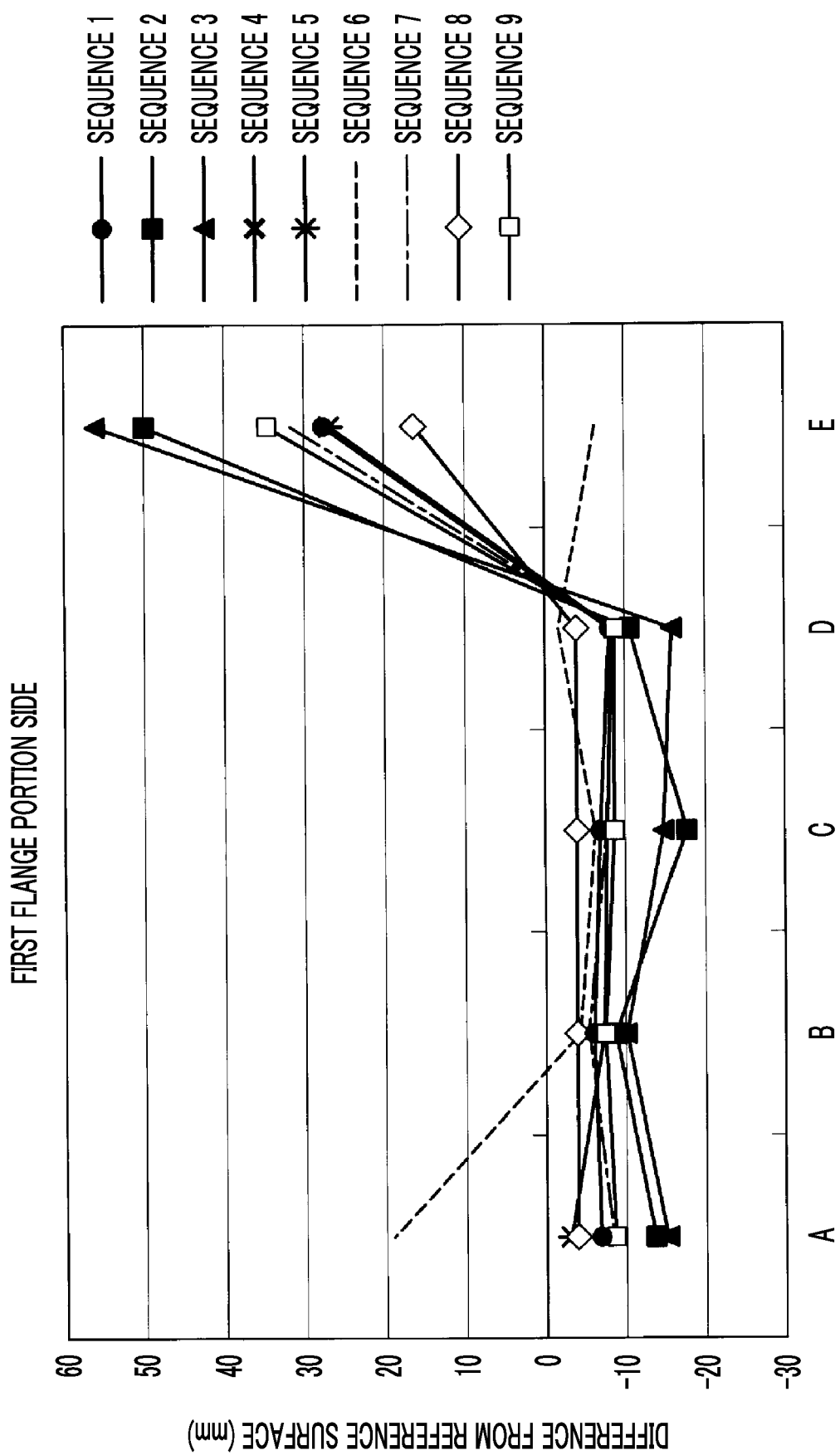
FIG. 8 is a graph showing a difference between an end portion of the web surface portion on a first flange portion side and a reference surface at each of predetermined positions (A to E of FIG. 7) in a longitudinal direction in a sequence number 1 to a sequence number 9 of FIG. 6.

FIG. 8 is a graph showing a difference between an end portion of the web surface portion 2 on the first flange portion 3 side and the reference surface at each of the predetermined positions (A to E of FIG. 7) in the longitudinal direction in the sequence number 1 to the sequence number 9. In addition, FIG. 9 is a graph showing a difference between an end portion of the web surface portion 2 on the second flange portion 4 side and the reference surface at each of the predetermined positions (A to E of FIG. 7) in the longitudinal direction in the sequence number 1 to the sequence number 9.

Figure 9:
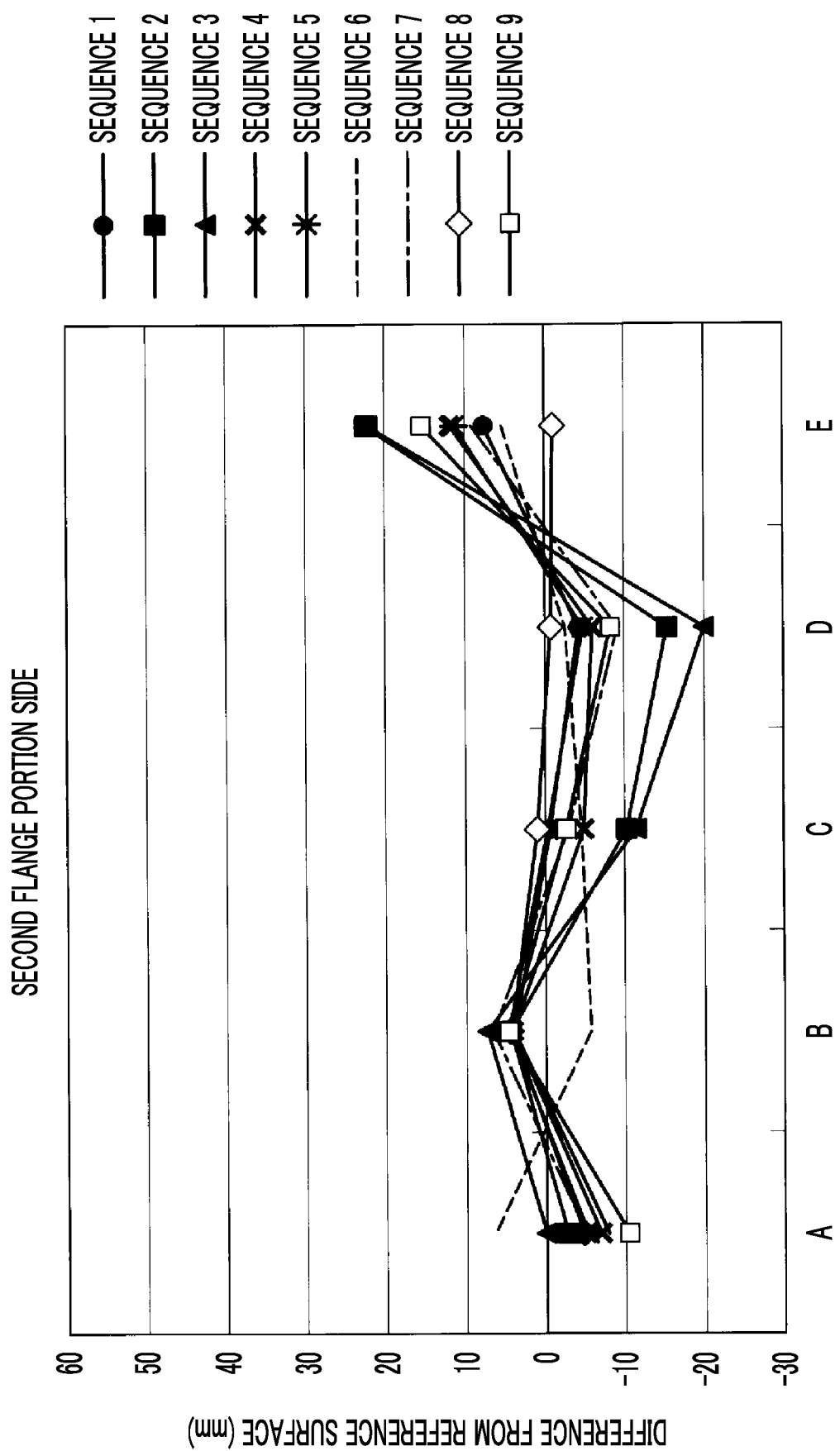
FIG. 9 is a graph showing a difference between an end portion of the web surface portion on a second flange portion side and the reference surface at each of the predetermined positions (A to E of FIG. 7) in the longitudinal direction in the sequence number 1 to the sequence number 9 of FIG. 6.

In FIGS. 8 and 9, a twist of the workpiece 1 is improved in all the cases compared to the case of the sequence number 3, that is a case in which rolling is not performed by the outlet-side pinch roll device 13.

Accordingly, it can be seen that the twist of the workpiece 1 can be corrected as the outlet-side pinch roll device 13 rolls. In addition, in particular, it can be seen that the twist can be effectively corrected in a case where the central region is rolled by the first roll 21 and the second roll 22 each of which has the small roll width w (the sequence number 7, the sequence number 8, and the sequence number 9), compared to a case where another region is rolled or a case where rolling is performed by the first roll 21 and the second roll 22 each of which has the large roll width w. In addition, from the sequence number 7 to the sequence number 9, it can be seen that a difference from the reference surface varies, and a twist correction effect varies due to a difference in a pressing force even in a case where the same region is rolled with the same roll width w.

Figure 10:
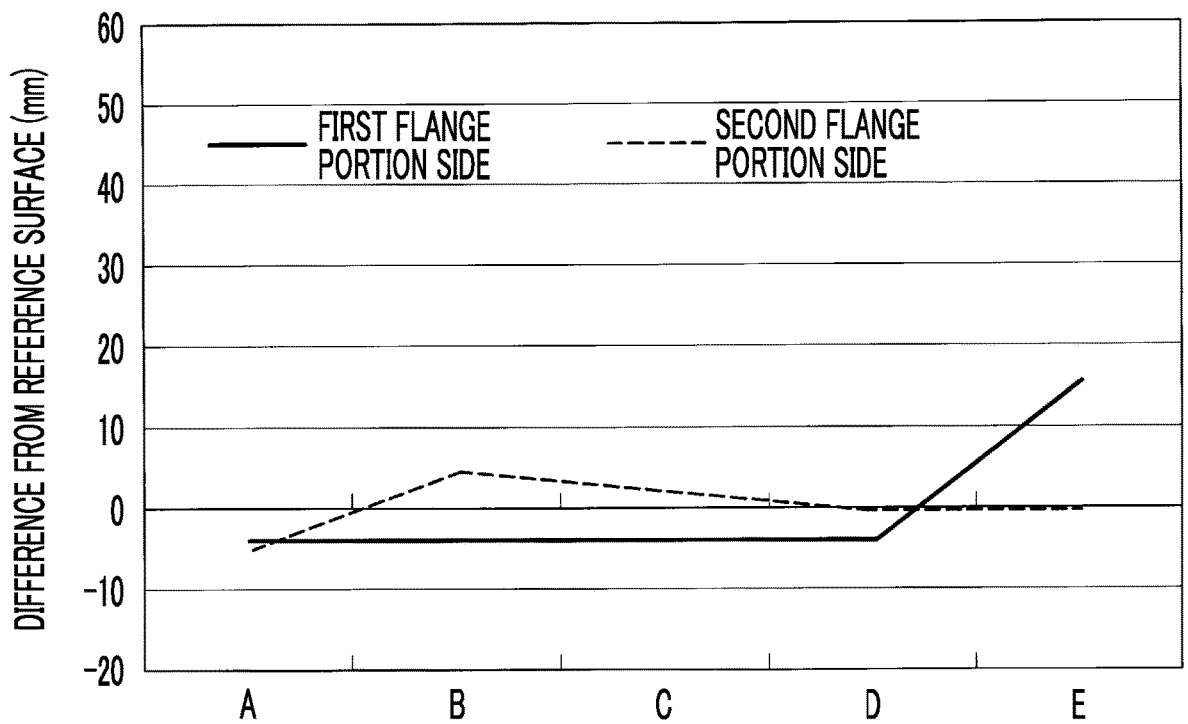
FIG. 10 is a graph showing a difference from the reference surface in the sequence number 8 of FIG. 6.
Figure 11:
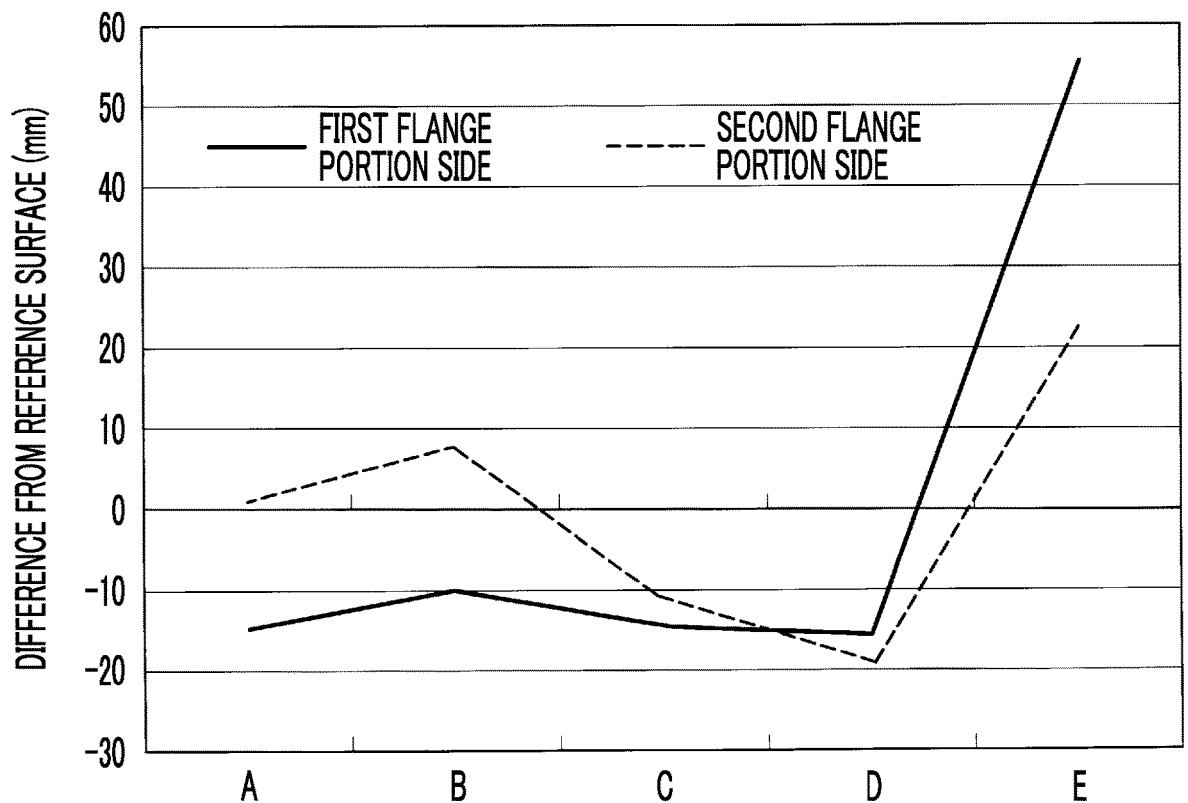
FIG. 11 is a graph showing a difference from the reference surface in the sequence number 3 of FIG. 6.

FIG. 10 is a graph extracted a difference from the reference surface of the sequence number 8, in which a twist is most improved. A solid line indicates a difference between the reference surface and the end portion on the first flange side, and a dashed line indicates a difference between the reference surface and the end portion on the second flange portion 4 side. In addition, FIG. 11 is a graph extracted a difference from the reference surface of the sequence number 3, which is a case where rolling is not performed by the outlet-side pinch roll device 13. A solid line indicates a difference between the reference surface and the end portion on the first flange side, and a dashed line indicates a difference between the reference surface and the end portion on the second flange portion 4 side.

As it is clear from FIGS. 10 and 11, as for any one of the end portion on the first flange side and the end portion on the second flange side, FIG. 10, in which rolling is performed by the outlet-side pinch roll device 13, has a smaller difference from the reference surface than FIG. 11, in which rolling is not performed. In addition, a difference from the reference surface is smaller at any position in the longitudinal direction. Therefore, from FIGS. 10 and 11, it can be seen that a twist of the workpiece 1 can be effectively corrected as the outlet-side pinch roll device 13 rolls.

Modification Example

A modification example of the present embodiment will be described. The present modification example is different from the embodiment in that the processing device 10 further includes a detecting device (detecting unit) (not illustrated) which detects a twist angle (twist amount) of the workpiece 1 and a control device (control unit) which controls the moving device 23 such that the first roll 21 is moved by a distance in accordance with the twist angle detected by the detecting device. The same configuration as in the embodiment will be assigned with the same reference sign, and detailed description thereof will be omitted.

The detecting device is, for example, a distance sensor, and detects a twist angle about the axis extending in the extending direction of the workpiece 1. The detecting device transmits the detected twist angle to the control device.

The control device controls a distance by which the first roll 21 moves in accordance with the received twist angle. That is, the control device controls a pressing force in accordance with the twist angle. As described above, even in a case where the same region is rolled with the same roll width w, a difference from the reference surface varies, and a twist correction effect varies due to a difference in a pressing force (refer to FIGS. 9 and 10). Therefore, by controlling a pressing force, the control device can cause the workpiece 1 to be rolled such that a correction amount is appropriate in accordance with the twist angle. Therefore, the twist of the workpiece 1 can be corrected more precisely.

The control device is, for example, configured by a central processing unit (CPU), a random access memory (RAM), a read only memory (ROM), and a computer readable storage medium. For example, a series of processes for realizing various types of functions are stored in the storage medium in a form of a program, and the program is read by the CPU with the RAM to execute an information processing and computing process, thereby realizing the various types of functions. The program may be applied in a form of being installed in advance in the ROM or other storage media, a form of being provided in a state of being stored in the computer readable storage medium, and a form of being distributed via communication means in a wired or wireless manner. The computer readable storage medium corresponds to a magnetic disk, a magneto-optical disk, a CD-ROM, a DVD-ROM, and a semiconductor memory.

The present disclosure is not limited to the invention according to the embodiment and the modification example, and can be modified as appropriate without departing from the gist thereof.

For example, although an example of processing the workpiece 1 provided with the lip portion 6 has been described in the embodiment, the present disclosure is not limited thereto. For example, the invention can also be applied to a case of processing the workpiece 1 configured only by the web surface portion 2, the first flange portion 3, and the second flange portion 4, without the lip portion 6. In addition, although an example of processing the workpiece 1 curved in the longitudinal direction has been described in the embodiment, the present disclosure is not limited thereto. For example, the invention can also be applied to a case of processing a linear workpiece.

In addition, although an example of disposing a device that corrects a twist of the workpiece 1 on the downstream side of the forming device 11 has been described in the embodiment, the present disclosure is not limited thereto. For example, the device may be disposed on the upstream side of the forming device 11.

In addition, although a configuration where the first roll 21 is moved by the moving device 23 has been described in the embodiment, the present disclosure is not limited thereto. The second roll 22 may be movable in the up-anddown direction by the moving device 23. In addition, both of the first roll 21 and the second roll 22 may be movable in the up-and-down direction by the moving device 23.

REFERENCE SIGNS LIST

1: workpiece
2: web surface portion
3: first flange portion
4: second flange portion
6: lip portion
10: processing device
11: forming device
12: inlet-side pinch roll device
13: outlet-side pinch roll device
16: support device
16a: first support device
16b: second support device
16c: third support device
16d: fourth support device
16e: fifth support device
17: roll
21: first roll
22: second roll
23: moving device
31: first roll
32: second roll
41: first roll
42: second roll
50: surface plate

The invention claimed is:

1. A processing device that processes a frame-shaped object to be processed, which extends in a predetermined extending direction and integrally has a plate-shaped first surface portion, a plate-shaped second surface portion which is bent and extends from one end of the first surface portion, and a plate-shaped third surface portion which is bent from the other end of the first surface portion and extends in a direction opposite to the second surface portion, the processing device comprising:
  a transporting unit that transports the object to be processed in the extending direction;
  a pressing unit that is provided on an upstream side or a downstream side from the transporting unit in a transporting flow of the object to be processed;
  wherein the pressing unit has a first contact portion that comes into contact with a central region on one surface side of the first surface portion in a direction intersecting the extending direction and a second contact portion that comes into contact with the central region on the other surface side of the first surface portion, and rolls the object to be processed by pressing the object to be processed such that the object to be processed is sandwiched between the first contact portion and the second contact portion;
  a moving unit that moves the first contact portion and/or the second contact portion in a direction of the object to be processed;
  a detecting unit that detects a twist amount of the object to be processed about an axis extending in the extending direction; and
  a control unit that controls the moving unit such that the first contact portion and/or the second contact portion moves by a distance in accordance with the twist amount detected by the detecting unit.

2. The processing device according to claim 1,
  wherein the first contact portion is a first roll that rotates about an axis extending in the direction intersecting the extending direction,
  the second contact portion is a second roll that rotates about an axis extending in the direction intersecting the extending direction, and
  widths of the first roll and the second roll are 30 to 60 percent of a width of the first surface portion.

3. A method for controlling a processing device that processes a frame-shaped object to be processed, which extends in a predetermined extending direction and integrally has a plate-shaped first surface portion, a plate-shaped second surface portion which is bent and extends from one end of the first surface portion, and a plate-shaped third surface portion which is bent from the other end of the first surface portion and extends in a direction opposite to the second surface portion,
  in which the processing device has
    a transporting unit that transports the object to be processed in the extending direction,
    a pressing unit that has a first contact portion coming into contact with a central region on one surface side of the first surface portion in a direction intersecting the extending direction and a second contact portion coming into contact with the central region on the other surface side of the first surface portion, presses the object to be processed such that the object to be processed is sandwiched between the first contact portion and the second contact portion, and is provided on an upstream side or a downstream side from the transporting unit in a transporting flow of the object to be processed,
    a moving unit that moves the first contact portion and/or the second contact portion in a direction of the object to be processed, and
    a detecting unit that detects a degree of a twist of the object to be processed about an axis extending in the extending direction, the method comprising a step of controlling the moving unit such that the first contact portion and/or the second contact portion moves by a distance in accordance with the degree of the twist detected by the detecting unit.

* * * * *